United States Patent
Li et al.

(10) Patent No.: US 9,608,728 B1
(45) Date of Patent: Mar. 28, 2017

(54) INTEGRATED CIRCUIT DEVICE WITH FIELD PROGRAMMABLE OPTICAL ARRAY

(71) Applicant: ALTERA CORPORATION, San Jose, CA (US)

(72) Inventors: Mike Peng Li, Palo Alto, CA (US); Joel Martinez, Hayward, CA (US); Jon Long, Livermore, CA (US); Weiqi Ding, Fremont, CA (US); Sergey Yuryevich Shumarayev, Los Altos Hills, CA (US)

(73) Assignee: Altera Corporation, San Jose, CA (US)

( * ) Notice: Subject to any disclaimer, the term of this patent is extended or adjusted under 35 U.S.C. 154(b) by 412 days.

(21) Appl. No.: 14/163,780

(22) Filed: Jan. 24, 2014

(51) Int. Cl.
- *H04B 10/00* (2013.01)
- *H04B 10/2575* (2013.01)
- *H04Q 11/00* (2006.01)
- *H04J 14/00* (2006.01)

(52) U.S. Cl.
CPC ..... *H04B 10/2575* (2013.01); *H04Q 11/0005* (2013.01)

(58) Field of Classification Search
CPC .... H04B 10/40; H04J 14/0279; H04J 14/028; G02B 6/43
See application file for complete search history.

(56) References Cited

U.S. PATENT DOCUMENTS

| | | | |
|---|---|---|---|
| 7,590,174 B2 | 9/2009 | Wong et al. | |
| 7,697,600 B2 | 4/2010 | Maangat et al. | |
| 7,773,668 B1 | 8/2010 | Wong et al. | |
| 8,184,651 B2 | 5/2012 | Chan et al. | |
| 8,615,201 B1 | 12/2013 | Li | |
| 2005/0078902 A1* | 4/2005 | Beausoleil | B82Y 20/00 385/1 |
| 2006/0093362 A1* | 5/2006 | Welch | G02B 6/12004 398/87 |
| 2012/0251116 A1 | 10/2012 | Li et al. | |
| 2014/0029943 A1* | 1/2014 | Mathai | H04J 14/0265 398/49 |
| 2014/0093245 A1* | 4/2014 | Kim | H04J 14/02 398/82 |
| 2014/0105613 A1* | 4/2014 | Yankov | H04B 10/801 398/142 |

* cited by examiner

*Primary Examiner* — Daniel Dobson
(74) *Attorney, Agent, or Firm* — Fletcher Yoder, P.C.

(57) ABSTRACT

Systems and methods are provided to improve flexibility of optical signal transmission between integrated circuit devices, and more specifically data utilization circuits. More specifically, the integrated circuit devices may include a data utilization circuit communicatively coupled to a field programmable optical array (FPOA). In some embodiments, the FPOA may convert an electrical signal received from the data utilization to an optical signal, route the optical signal to an optical channel, and multiplex the optical signal with other optical signals routed to the optical channel. Additionally or alternatively, the FPOA may de-multiplex a multiplexed optical signal based on wavelength, route an optical signal included in the multiplexed optical signal to an electrical channel, convert the optical signal into an electrical signal, and output the electrical signal to the data utilization circuit via an electrical channel. In some embodiments, the FPOA may improve flexibility by performing such functions without reconfiguring the data utilization circuit.

25 Claims, 5 Drawing Sheets

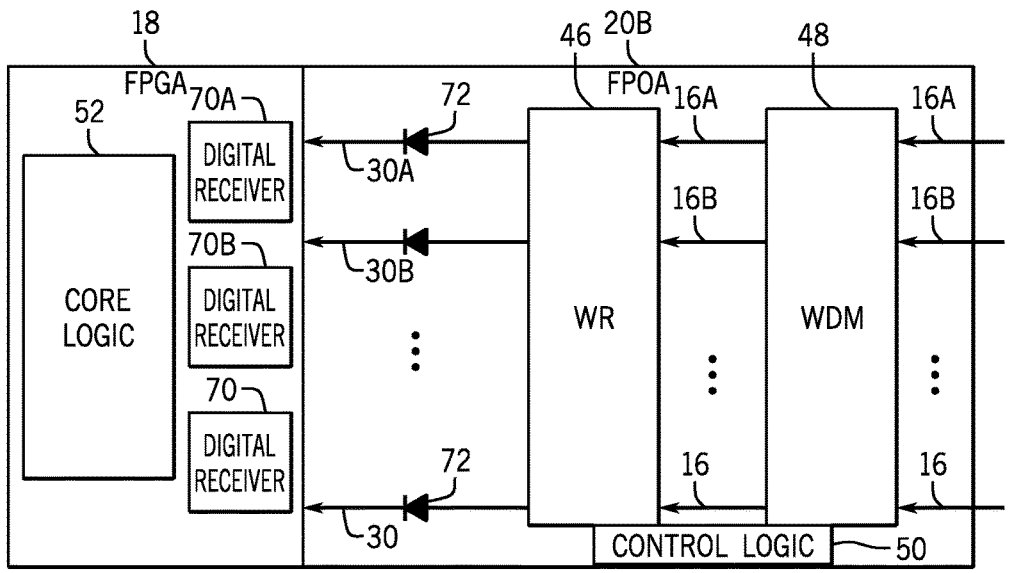
FIG. 6
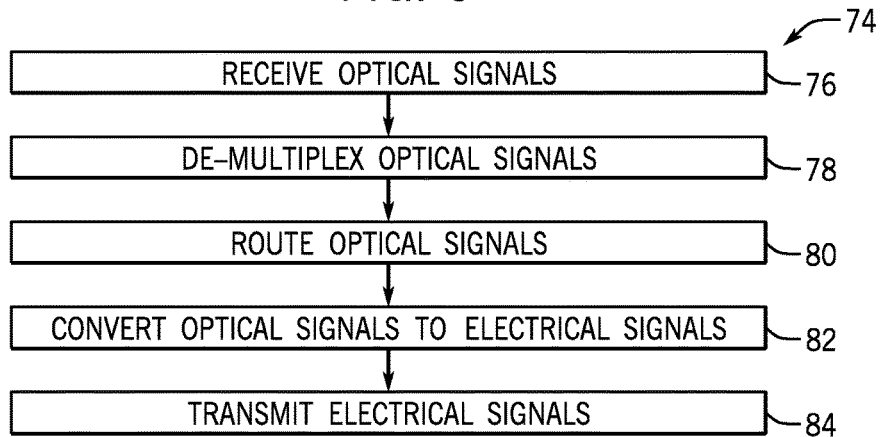
FIG. 7
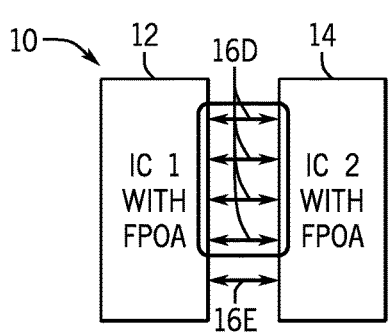 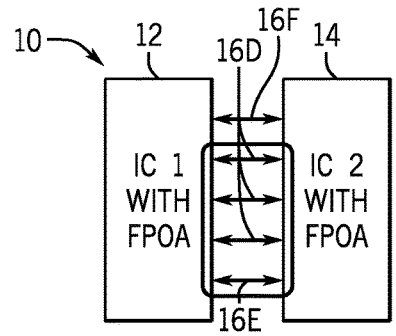
FIG. 8A    FIG. 8B

INTEGRATED CIRCUIT DEVICE WITH FIELD PROGRAMMABLE OPTICAL ARRAY

BACKGROUND

This disclosure relates to integrated circuit devices and, more particularly, to optical data communication between integrated circuit devices.

This section is intended to introduce the reader to various aspects of art that may be related to various aspects of these techniques, which are described and/or claimed below. This discussion is believed to be helpful in providing the reader with background information to facilitate a better understanding of the various aspects of this disclosure. Accordingly, it should be understood that these statements are to be read in this light, and not as admissions of prior art.

Integrated circuit devices are often found in a variety of electronic systems, such as computers, handheld devices, portable phones, televisions, and industrial control systems. In such electronic systems, the integrated circuit devices may provide various features such as data processing and/or data storage. Accordingly, integrated circuit devices may include data processing circuits, such as a field programmable gate array (FPGA) or other processing circuitry (e.g., CPU or GPU), and data storage circuits, such as random access memory (RAM). As used herein, a "data utilization circuit" is intended to generally describe the circuits (e.g., data storage circuits and data processing circuits) that provide features within an electronic system.

To provide the various features, data utilization circuits may communicate data with one another. For example, an FPGA may communicate data to memory for storage, or memory may communicate a machine-readable instruction to the FPGA for performing a particular process. In some embodiments, the various data utilization circuits may communicate data via optical signals to improve data communication speeds and/or transmission distances. For example, a first data utilization circuit may output an electrical signal on an electrical channel, the electrical signal may be converted to an optical signal, and the optical signal may be transmitted to a second data utilization circuit via an optical channel.

In some embodiments, the data transmitted on each optical channel is based on the data output on a corresponding electrical channel. Illustratively, the first data utilization circuit may output a first electrical signal including first data on a first electrical channel and a second electrical signal including second data on a second electrical channel. The first electrical signal may then be converted to a first optical signal and transmitted to a second data utilization circuit via a first optical channel, which corresponds to the first electrical channel. Similarly, the second electrical signal may be converted to a second optical signal and transmitted to a third data utilization circuit via a second optical channel, which corresponds to the second electrical channel. In such embodiments, optical signals transmitted on an optical channel may be modified by reconfiguring the data utilization circuits. For example, to transmit the second data to the second data utilization circuit, the first data utilization circuit may be reconfigured to output the second data on the first electrical channel.

However, it may be beneficial to improve the flexibility of the optical signal communication between data utilization circuits. For example, it may be beneficial to route the second optical signal from the second electrical channel to the first optical channel without re-configuring the first data utilization circuit.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of this disclosure relate to systems and methods for improving flexibility and reconfigurability in optical signal communication between integrated circuit devices. To improve flexibility and reconfigurability, an integrated circuit device may include a field programmable optical array (FPOA) communicatively coupled to a data utilization circuit. More specifically, the field programmable optical array may route data, multiplex data, and/or de-multiplex data without reconfiguring the data utilization circuit. For example, the field programmable optical array may route multiple optical signals to a single optical channel to increase the bandwidth of the optical channel or route an optical signal to an optical channel based on the intended recipient of the optical signal. Accordingly, in some embodiments, the techniques described herein may improve flexibility by enabling the output/input configuration (e.g., bandwidth) to be dynamically adjusted. Additionally, the techniques described herein may provide additional features (e.g., improved reliability) in specific use cases, such as redundant memory or switchover.

Various refinements of the features noted above may be made in relation to various aspects of this disclosure. Further features may also be incorporated in these various aspects as well. These refinements and additional features may be made individually or in any combination. For instance, various features discussed below in relation to one or more of the illustrated embodiments may be incorporated into any of the above-described aspects of this disclosure alone or in any combination. The brief summary presented above is intended only to familiarize the reader with certain aspects and contexts of embodiments of this disclosure without limitation to the claimed subject matter.

BRIEF DESCRIPTION OF THE DRAWINGS

Various aspects of this disclosure may be better understood upon reading the following detailed description and upon reference to the drawings in which:

FIG. 6 is a block diagram of the first integrated circuit of FIG. 1 including a data utilization circuit and a receiving field programmable optical array, in accordance with an embodiment;

FIG. 7 is a flowchart describing a process for utilizing the field programmable optical array of FIG. 6 to receive optical signals, in accordance with an embodiment;

FIG. 8A is a block diagram of the first and second integrated circuit of FIG. 1 communicating through four primary optical channels, in accordance with an embodiment;

FIG. 8B is a block diagram of the first and second integrated circuit of FIG. 1 communicating through three of the four primary optical channels and a spare optical channel when the fourth primary optical channel is faulty, in accordance with an embodiment;

DETAILED DESCRIPTION

Figure 1:
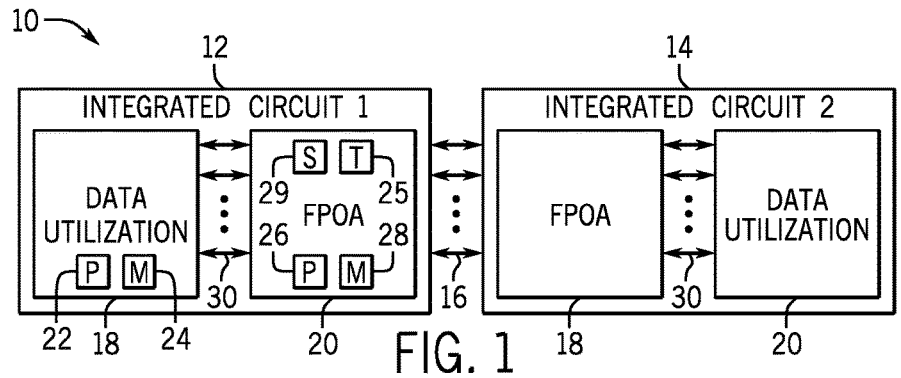
FIG. 1 is a block diagram of an electro-optical system that includes a first integrated circuit device communicatively coupled to a second integrated circuit, in accordance with an embodiment.

One or more specific embodiments of this disclosure will be described below. These described embodiments are only examples of the disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of this disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of this disclosure are not intended to be interpreted as excluding the existence of additional embodiments that also incorporate the recited features.

As described above, integrated circuits devices, and more specifically data utilization circuits, may generally be included in a wide range of electronic systems to provide various features, such as data storage and/or data processing. To facilitate these various features, data utilization circuits may communicate data between themselves via optical signals, which may improve bandwidth and transmission distances as compared to electrical signals.

More specifically, a data utilization circuit may output data as an electrical signal via an electrical channel. The electrical signal may then be converted to an optical signal and transmitted via an optical channel. In some embodiments, the data transmitted on each optical channel may directly correspond to the data output on a specific (e.g., preconfigured or predetermined) electrical channel. In such an embodiment, the data utilization circuit may be reconfigured (e.g., reprogrammed) to output data via a specific electrical channel to transmit the data on an optical channel that corresponds to that electrical channel. However, it may be beneficial to improve the flexibility of the optical signal transmissions by, for example, enabling the routing of data to different optical channels without reconfiguring the data utilization circuit (e.g., without regard to what electrical channel the data is output on).

Accordingly, one embodiment of the present disclosure describes a system that includes a field programmable optical array (FPOA) communicatively coupled to a data utilization circuit. The FPOA may convert an electrical signal received from the data utilization circuit to a first optical signal, in which the optical signal has a first wavelength, and route the first optical signal to an optical channel. Additionally, the FPOA may multiplex the first optical signal with a second optical signal routed to the optical channel, in which the second optical signal includes a second wavelength. In other words, the FPOA may route data output from the data utilization circuit to any optical channel, and may even multiplex (e.g., combine) the data output on multiple electrical channels to a single or multiple optical channels.

Another embodiment of the present disclosure describes a system that includes a field programmable optical array (FPOA) communicatively coupled to a data utilization circuit. The FPOA may de-multiplex a multiplexed optical signal including a first optical signal and a second optical signal, in which the first optical signal has a first wavelength and the second optical signal has a second wavelength. Additionally, the FPOA may route the first optical signal to a first electrical channel, convert the first optical signal to a first electrical signal, and output the first electrical signal to the data utilization circuit via the first electrical channel. In other words, the FPOA may de-multiplex (e.g., separate) data on an optical channel and route the data to one or more electrical channels to be input into the data utilization circuit. In some embodiments, the routing, multiplexing, and/or de-multiplexing may be performed in the FPOA without reconfiguring the data utilization circuit.

By way of introduction, FIG. 1 depicts an embodiment of an electronic system 10 that includes a first integrated circuit device 12 communicatively coupled to a second integrated circuit device 14. More specifically, the integrated circuits 10 and 12 are communicatively coupled via one or more optical channels 16 that carry optical signals to enable data transmission between the integrated circuits 10 and 12. For example, the integrated circuits 10 and 12 may be coupled via sixteen optical channels. In some embodiments, the optical channels 16 may include optical fibers, made of glass or plastic, that carries or guides photons (e.g., visible or invisible light).

Additionally, as depicted, each integrated circuit device 10 or 12 also includes a data utilization circuit 18 and a field programmable optical array (FPOA) 20. Although the depicted embodiment includes one data utilization circuit 18 and one FPOA 20 on each integrated circuit device, other embodiments may include multiple data utilization circuits 18 and/or multiple FPOAs 20. For example, multiple data utilization circuits 18 may be coupled to (e.g., utilize) a single FPOA 20, or a single data utilization circuit 18 may be coupled to (e.g., utilize) multiple FPOAs 20.

As described above, the data utilization circuit 18 may be a data processing circuit, such as an FPGA, or a data storage circuit, such as memory. To facilitate such features, the data utilization circuit 18 may include one or more processors 22 and memory 24. The FPOA 20 may convert electrical signals to optical signals and vice versa, transmit optical signals to another FPOA 20 via optical channels 16, receive optical signals from another FPOA 20 via optical channels 16, or any combination thereof. In other words, the FPOA 20 may include an optical signal transceiver 25 to transmit and/or receive optical signals. Moreover, as will be described in more detail below, the FPOA 20 may route optical signals, multiplex multiple optical signals into a single optical signal, de-multiplex an optical signal into multiple optical signals, or any combination thereof. To facilitate these features, the FPOA 20 may similarly include one or processors 26 and memory 28.

Furthermore, as depicted, the data utilization circuit 18 and the FPOA 20 are communicatively coupled. More specifically, the data utilization circuit 18 and the FPOA may be communicatively coupled via one or more electrical channels 30 that may carry electrical signals to enable data transmission between the data utilization circuit 18 and the FPOA 20. For example, the data utilization circuit 18 and the FPOA 20 may be coupled via sixteen electrical channels 30. However, in other embodiments, any suitable number electrical channels (e.g., thirty-two electrical channels 30) may be utilized.

Moreover, the data utilization circuit 18 and the FPOA 20 may be located in close proximity to one another. More specifically, because the operation characteristics of the data utilization circuit 18 may vary based on the environment (e.g., temperature or external noise), the FPOA 20 may determine the operation environment and adjust accordingly. Accordingly, as depicted, the FPOA 20 includes a sensor 29 to detect environmental conditions such as temperature. In other words, the FPOA 20 may self-calibrate its operation.

For example, in some embodiments, the data utilization circuit 18 and the FPOA 20 may be may be included on the same semiconductor chip (e.g., directly integrated). In other words, the data utilization circuit 18 and the FPOA 20 may be monolithically integrated. In such embodiments, the electrical channels 30 may be conductive paths etched into the semiconductor chip. In other embodiments, the data utilization circuit 18 and the FPOA 20 may be discrete semiconductor chips. In such embodiments, the electrical channels 30 may be electrical wires (e.g., electrical bus) or, when the data utilization circuit 18 and the FPOA 20 are coupled to the same printed circuit board, conductive traces on the printed circuit board.

Figure 2:
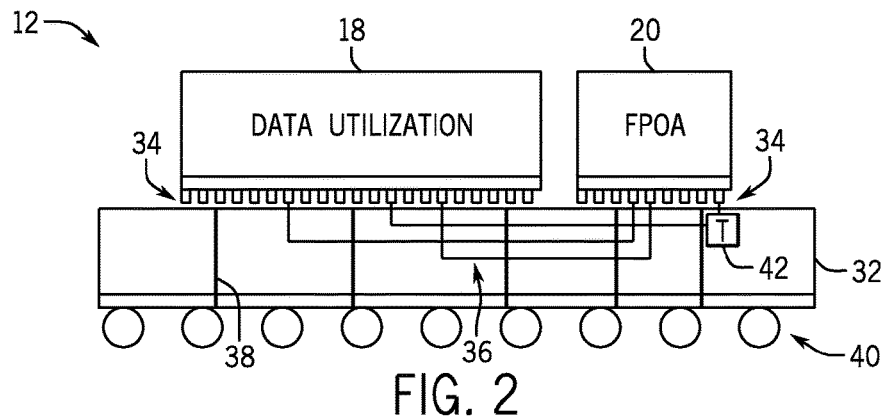
FIG. 2 is a side view of the first integrated circuit device of FIG. 1 coupled to an interposer, in accordance with an embodiment.

Still further, in other embodiments, the data utilization circuit 18 and the FPOA 20 may be connected via an interposer 32 (e.g., in a 2.5D configuration), as depicted in FIG. 2. In other words, the data utilization circuit 18 and the FPOA may be heterogeneously integrated. More specifically, the data utilization circuit 18 and the FPOA 20 may communicate through microbumps 34 joined to the interposer 32. The microbumps 34 connect the data utilization circuit 18 and the FPOA 20 to chip-to-chip interconnects 36 within the interposer 32. These chip-to-chip interconnects 36 provide communication channels through various depths of the interposer 32. Furthermore, through-silicon vias (TSVs) 38 may connect certain of the microbumps 34 and/or chip-to-chip interconnects 36 to C4 interconnects 40.

As described above, the FPOA 20 may include an optical signal transceiver feature 25 to transmit and/or receive optical signals via optical channels 16. Accordingly, the FPOA 20 may be directly coupled the optical channels 16. In some embodiments, the FPOA 20 may additionally be coupled to the optical channels 16 via a discrete optical signal transceiver 42. As depicted, the discrete optical signal transceiver 42 may be included within the interposer 32 and connected to the FPOA 20 and data utilization circuit 18 by the chip-to-chip interconnects 36. In other embodiments, the discrete optical signal transceiver 42 may be coupled to the FPOA 20 and/or data utilization circuit 18 by wires, conductive traces, and the like.

When the FPOA 20 is connected to a discrete optical signal transceiver 42, the discrete optical transceiver 42 may serve as an alternate path for optical signals. For example, if the optical signal transceiver 25 in the FPOA 20 malfunctions, optical signals may still be transmitted to/from the FPOA 20 via the discrete optical signal transceiver 42. In other embodiments, if the FPOA 20 is malfunctioning, the FPOA may be bypassed and the data utilization circuit 18 may utilize the discrete optical signal transceiver 42 to convert between electrical signals and optical signals.

Figure 3:
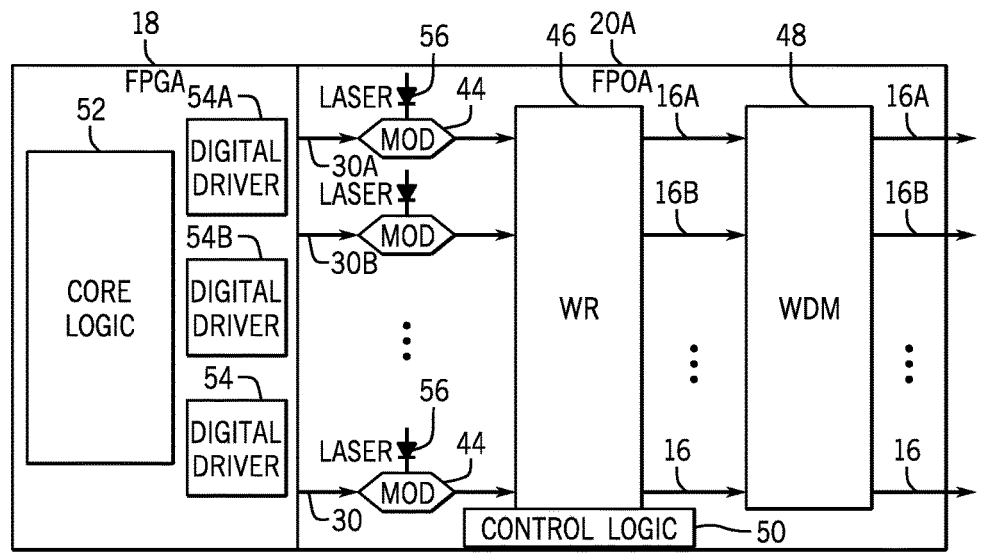
FIG. 3 is a block diagram of the first integrated circuit of FIG. 1 including a data utilization circuit and a transmitting field programmable optical array, in accordance with an embodiment.

As described above, the FPOA 20 may facilitate transmitting optical signals from one data utilization circuit 18 to another. Accordingly, a transmitting FPOA 20A may include modulators 44 to convert electrical signals to optical signals, a wavelength router (WR) 46 to route the optical signals, and a wavelength division multiplexer (WDM) 48 to multiplex optical signals, as depicted in FIG. 3. The functionality of each of these components, which will be described in more detail below, may be controlled by control logic 50. In some embodiments, such as the depicted embodiment, the control logic 50 may be included in the FPOA 20. Accordingly, the control logic 50 may be discrete control logic, such as an application specific integrated circuit, or non-transitory machine-readable instructions stored in the FPOA memory 28 and executed by the processor 26. In other embodiments, the control logic 50 may be included in the data utilization circuit 18 as non-transitory machine-readable instructions stored in the data utilization memory 24 and executed by the processor 22.

As described above, the data utilization circuit 18 may output data as electrical signals. To help illustrate, the data utilization circuit 18 will be described as generally including core logic 52 and digital drivers 54. As used herein, the core logic 52 describes the data storage and/or data processing functions provided by the data utilization circuit 18. In other words, the core logic 52 may generate data to be output when the data utilization circuit 18 is a data processing circuit, or may retrieve data to be output when the data utilization circuit 18 is a data storage circuit. Accordingly, the core logic 52 may include the data utilization processor 22 and/or memory 24.

Additionally, the digital drivers 54 may output the data generated/retrieved by the core logic 52 as electrical signals. More specifically, the electrical signals may be output on the electrical channels 30. In some embodiments, each digital driver 54 may output electrical signals on a particular electrical channel 30. In other words, the number of digital drivers 54 may be equal to the number of electrical channels 30. For example, a first digital driver 54A may output electrical signals on a first electrical channel 30A and a second digital driver 54B may output electrical signal on a second electrical channel 30B. As described above, in some embodiments, the data utilization circuit 18 may output electrical signals on sixteen electrical channels 30. In such an embodiment, the data utilization circuit 18 may include sixteen digital drivers 54. In other embodiments, each digital driver 54 may selectively output electrical signals on multiple electrical channels. In other words, the number of digital driver 54 may be less than the number of electrical channels 30.

As described above, the modulators 44 may convert electrical signals output by the data utilization circuit 18 into optical signals. Accordingly, as depicted, each modulator 44 may be coupled to an electrical channel 16 and include a laser 56 to vary the light transmittance time within each optical signal period (e.g., one wavelength). In other words, the modulators 44 may pulse width modulate the laser 56 to encode the optical signal on the carrier wavelength. In other embodiments, the modulator 44 may additionally or alternatively amplitude module the laser 56 to encode the optical signal on the carrier wavelength. Accordingly, the modulators 44 may convert the electrical signals into a respective sixteen optical signals. Moreover, as will be described in more detail below, each optical signal may provide a specific data rate (e.g., 25 Gb/s). Accordingly, multiple optical signals may proportionally increase the data rate. For example, four optical signals may have a combined data rate of 100 Gb/s.

Furthermore, optical signals generated by the modulators 44 may be wavelength modulated optical signals. In other words, each modulator 44 may generate optical signals with a specific wavelength, which may be the same as or vary from the wavelength of the optical signals generated by the other modulators. In some embodiments, the control logic 50 may instruct the modulators 44 to generate optical signals with a specific wavelength between 1271-1351 nanometers. As will be described in more detail below, utilizing varying wavelengths may facilitate multiplexing multiple optical signals onto a single optical channel.

As described above, the wavelength router 46 may route the optical signals to optical channels 16. Accordingly, as depicted, the wavelength router 46 may be coupled between the electrical channels 30 and the electrical channels 16. As used herein, an "electrical channel" is intended to describe the channel between the data utilization circuit 18 and the wavelength router 46. In other words, even though the modulator 44 converts an electrical signal into an optical signal, the optical signal may continue on the electrical channel before reaching the wavelength router 46.

In some embodiments, the control logic 50 may instruct the wavelength router 46 to route an optical signal to a specific optical channel 16 based on the data utilization circuit 18 the optical signal is intended to be transmitted to. For example, when a first optical channel 16A outputs to a first data utilization circuit and a second optical channel 16B outputs to a second data utilization circuit, the wavelength router 46 may route a first optical signal intended for the first data utilization circuit to the first optical channel 16A and a second optical signal intended for the second data utilization circuit to the second optical channel 16B. In the described example, the first optical signal may be converted from an electrical signal output on the first electrical channel 30A or the second electrical channel 30B. In other words, the wavelength router 46 may increase the flexibility of the FPOA 20 by enabling data (e.g., on optical signals) to be routed to different optical channels 16 without reconfiguring the data utilization circuit 18.

Moreover, in some embodiments, the wavelength router 46 may route one optical signal to multiple optical channels 16. In other words, the wavelength router 46 may duplicate optical signals in addition to merely routing optical signals.

Accordingly, the wavelength router 46 may adjust the bandwidth of each optical channel 16 as desired via routing of optical signals. Illustratively, because each electrical signal output by the data utilization circuit 18 communicates data at some data rate (e.g., 25 Gb/s), each optical signal converted from the electrical signals may communicate data at that data rate (e.g., 25 Gb/s). Thus, if one optical signal is routed to an optical channel 16, the optical channel 16 may have a bandwidth of that data rate (e.g., 25 Gb/s). On the other hand, if the two optical signals (e.g., multiplexed together) are routed to the same optical channel 16, the optical channel 16 may have a bandwidth of twice the data rate (e.g., 50 Gb/s).

To facilitate the bandwidth adjustment, when the wavelength router 46 routes multiple optical signals to an optical channel 16, the wavelength division multiplexer 48 may multiplex (e.g., combine) the optical signals. Accordingly, as depicted, the wavelength division multiplexer 48 is coupled on the optical channels 16. More specifically, the wavelength division multiplexer 48 may combine optical signals with differing wavelengths onto a single optical channel 16 because light may include multiple frequencies (e.g., wavelengths per second) that do not interfere with one another. For example, the wavelength division multiplexer 48 may multiplex a first optical signal with a wavelength of 1300 nanometers with a second optical signal with a wavelength of 1310 nanometers. In other words, the wavelength router 46 and/or the wavelength division multiplexer 48 may increase the flexibility (e.g., scalability) of the FPOA 20 by enabling the bandwidth adjustment on each optical channel 16 without reconfiguring the data utilization circuit 18.

Figure 4A:
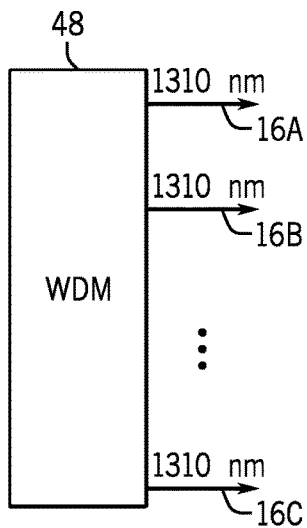
FIG. 4A is a block diagram of a wavelength-division multiplexer with parallel outputs included in the field programmable optical array of FIG. 3, in accordance with an embodiment.
Figure 4B:
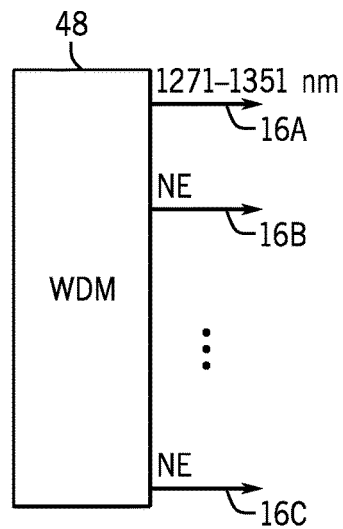
FIG. 4B is a block diagram of a wavelength-division multiplexer with multiplexed outputs included in the field programmable optical array of FIG. 3, in accordance with an embodiment.
Figure 4C:
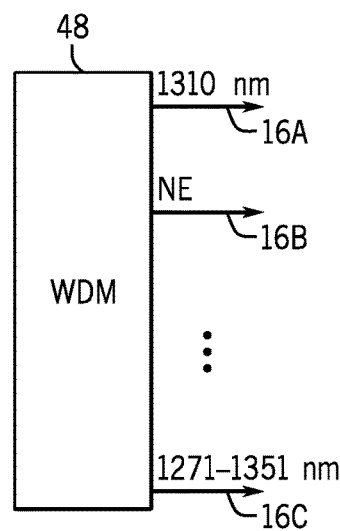
FIG. 4C is a block diagram of a wavelength-division multiplexer with hybrid outputs included in the field programmable optical array of FIG. 3, in accordance with an embodiment.

To help illustrate, three interchangeable optical signal output configurations (e.g., different bandwidth configurations) are described in FIG. 4A-4C. More specifically, FIG. 4A describes a parallel output configuration, FIG. 4B describes a multiplexed output configuration, and FIG. 4C describes a hybrid output configuration (e.g., combination of parallel and multiplexed configurations). As depicted, each configuration describes the wavelength of the optical signal or signals carried on the first optical channel 16A, the second optical channel 16B, and an nth optical channel 16C. It should be noted that although other optical channels 16 (e.g., thirteen other optical channels) are not explicitly depicted, they may operate according to the general output scheme of each configuration.

As described above, FIG. 4A describes a parallel output configuration. As depicted, the first optical channel 16A, the second optical channel 16B, and the nth optical channel 16C may each carry an optical signal with a wavelength of 1310 nanometers. In other embodiments, the wavelength of the optical signals carried on each optical channel 16 may vary from one another. For example, the first optical channel 16 may carry an optical signal with a wavelength of 1300 nanometers and the second optical channel may carry an optical with a wavelength of 1320 nanometers. In other words, in a parallel output configuration, each optical channel 16 may carry a single optical signal. Accordingly, each optical channel 16 may have a bandwidth of 25 Gb/s.

Additionally, as described above, FIG. 4B describes a multiplexed output configuration. As depicted, the first optical channel 16A carries multiple optical signals each with different wavelengths between 1271 nanometers and 1351 nanometers, and the second optical channel 16B and the nth optical channel 16C do not carry optical signals. In other words, all of the data output by the data utilization circuit 18 may be communicated via the first optical channel 16A. Accordingly, when sixteen optical signals are output on the first optical channel 16A, the first optical channel 16A may have a bandwidth of sixteen times the data rate of a single channel (e.g., 16*25 Gb/s or 400 Gb/s).

Furthermore, as described above, FIG. 4C describes a hybrid output configuration. As depicted, the first optical channel 16A carries a single optical signal with a wavelength of 1310 nanometers, the second optical channel 16B does not carry optical signals, and the nth optical channel 16C carries multiple optical signals each with different wavelengths between 1271 nanometers and 1351 nanometers. The other optical channels 16 (not depicted) may similarly also carry no optical signals, a single optical signal, or multiple optical signals. Moreover, as will be described in more detail below, the bandwidth of each optical channel 16 may be adjusted based on changing desires. In other words, each optical channel 16 may dynamically switch between carrying no optical signals, a single optical signal, or multiple optical signals. Accordingly, the FPOA 20 may transmit data at varying different bandwidths on each optical channel 16 substantially simultaneously.

Figure 5:
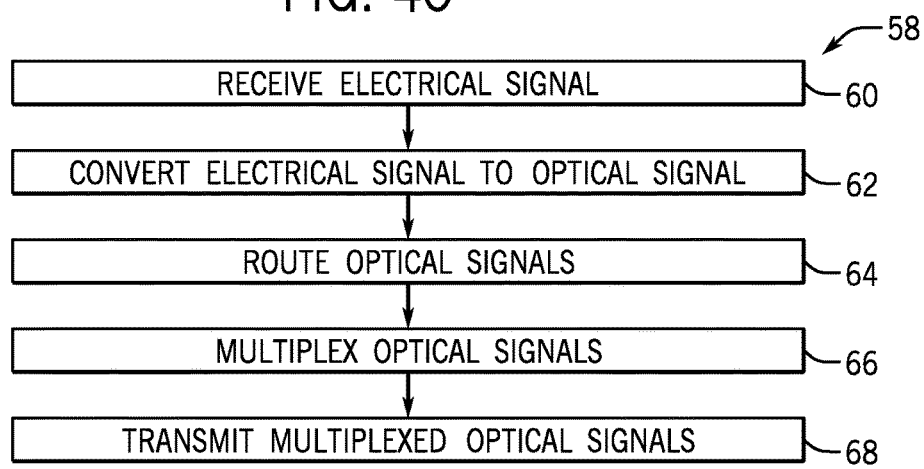
FIG. 5 is a flow chart describing a process for utilizing the field programmable optical array of FIG. 3 to transmit optical signals, in accordance with an embodiment.

Based on the FPOA 20 described above, FIG. 5 describes a process 58 for transmitting optical signals. As depicted, the process 58 includes receiving an electrical signal (process block 60), converting the electrical signal into an optical signal (process block 62), routing the optical signal to an optical channel 16 (process block 64), multiplexing the optical signal with other optical signals routed to the optical channel (process block 66), and transmitting the optical signal (process block 68).

More specifically, the FPOA 20 may receive the electrical signal from the data utilization circuit 18 via an electrical channel (process block 60). As described above, the electrical signal may include data generated/retrieved by the core logic 52 and output by the digital drivers 54. The control logic 50 may then instruct the modulator 62 to convert the electrical signal into an optical signal (process block 62). As described above, optical signals with differing wavelengths may be multiplexed together. Accordingly, the control logic 50 may instruct the modulator 62 to generate an optical signal with a specific wavelength.

In some embodiments, the specific wavelength may be based at least in part on which optical channel 16 the optical signal will be routed to, environmental conditions, the wavelength and/or number of other optical signals that will be routed to that optical channel 16, the data to be communicated on via the optical signal, a default wavelength (e.g., 1310 nanometers), the data utilization circuit 18 that will receive the optical signal, or any combination thereof. For example, if the data to be represented is largely digital "1," the control logic 50 may select a shorter wavelength to reduce the amount of time the laser 56 will be transmitting light (e.g., "on"). Accordingly, the control logic 50 may determine such factors, for example by polling the components (e.g., sensor 29) of the FPOA 20 and/or the data utilization circuits 18 communicatively coupled to the FPOA 20 (e.g., both the transmitting and receiving data utilization circuits 18).

The control logic 50 may then instruct the wavelength router 46 to route the optical signal to a specific optical channel (process block 64). As described above, the wavelength router 46 may route the optical signal to an optical channel 16 based on the intended recipient (e.g., data utilization circuit 18) of the optical signal. For example, when a first optical channel 16A outputs to a first data utilization circuit and a second optical channel 16B outputs to a second data utilization circuit, the wavelength router 46 may route a first optical signal intended for the first data utilization circuit to the first optical channel 16A and a second optical signal intended for the second data utilization circuit to the second optical channel 16B. In some embodiments, multiple optical channels 16 may output to the same data utilization circuit 18. In such an embodiment, the optical signal may be routed to any of the multiple optical channels 16 or be routed to a specific one of the multiple optical channels 16 based at least in part on the type of data. For example, when one of the multiple optical channels 16 is dedicated to status data, an optical signal including status data may be routed that the dedicated status optical channel.

The control logic 50 may then instruct the wavelength division multiplexer 66 to multiplex the optical signal with other optical signals routed to the same optical channel 16 (process block 66). As can be appreciated, when only one optical signal is routed to an optical channel 16 (e.g., in a parallel configuration), the control logic 50 may instruct the wavelength division multiplexer 48 to leave the optical signal alone. The control logic 50 may then instruct the FPOA 20 to transmit the optical signals via the optical channels 16 in one of the output configurations described above (e.g., parallel, multiplexed, or hybrid).

On the other side, as described above, the FPOA 20 may facilitate receiving optical signals transmitted from another data utilization circuit 18. Accordingly, the receiving FPOA 20B may include the wavelength division multiplexer (WDM) 48 to de-multiplex optical signals, the wavelength router (WR) 46 to route the optical signals, and photodiodes to convert optical signals to electrical signals, as depicted in FIG. 6. It should be noted that although the transmitting FPOA 20A and the receiving FPOA 20B are described separately, they may be included in the same FPOA 20 and share comments. For example, the wavelength division multiplexer 48, the wavelength router 46, the electrical channels 30, the optical channels 16, or any combination thereof may be utilized in both the transmission and reception of data. Additionally or alternatively, the FPOA 20 may include separate wavelength division multiplexers 48 and wavelength routers 46 for transmission and reception of optical signals. The functionality of each of these components may be controlled by control logic 50, which as described above, may be included in the FPOA 20 or the data utilization circuit 18.

As described above, the data utilization circuit 18 may receive data as electrical signals. To help illustrate, the data utilization circuit 18 will be describes as generally including the core logic 52 and digital receivers 70. As described above, the core logic 52 may include the data storage and/or data processing functions. In other words, the data utilization circuit 18 may receive data for processing in the core logic 52 when the data utilization circuit 18 is a data processing circuit, or may receive data to be stored in the core logic 52, and more specifically memory 24, when the data utilization circuit 18 is a data storage circuit.

More specifically, the digital receivers 70 may receive the data to be processed/stored by the core logic 52 as electrical signals. In some embodiments, each digital receiver may receive electrical signals on a particular electrical channel 30. In other words, the number of digital receivers 70 may be equal to the number of electrical channels 30. For example, a first digital receiver 70A may receive electrical signals from a first electrical channel 30A and a second digital receiver 70B may receive electrical signals from a second electrical channel 30B. In some embodiments, the data utilization circuit 18 may include sixteen digital receivers 70 to receive electrical signals from sixteen electrical channels 30. In other embodiments, each digital receiver 70 may receive electrical signals on multiple electrical channels. It should be noted that although the digital drivers 54 and digital receivers 70 are separately described, in some embodiments, they may be combined as a digital transceiver.

To facilitate communicating electrical signals to the data utilization circuit 18 when the FPOA 20 receives optical signals, the wavelength division multiplexer 48 may de-multiplex received optical signals. Accordingly, as depicted, the wavelength division multiplexer is coupled on the optical channels 16. More specifically, as described above, multiple optical signals may be multiplexed together (e.g., combined) on an optical channel 16. Thus, the wavelength division multiplexer 48 may de-multiplex (e.g., separate) the optical signals based on the wavelengths of the optical signals. For example, if an optical channel receives a multiplexed optical signal including a first optical signal with a wavelength of 1300 nanometers and a second optical signal with a wavelength of 1310 nanometers, the wavelength division multiplexer 48 may separate the first optical signal and second optical signal based on their differing wavelengths.

As described above, the wavelength router 46 may route de-multiplexed optical signals to the various electrical channels 30. Accordingly, as depicted, the wavelength router 46 may be coupled between the optical channels 16 and the electrical channels 30. As described above, "electrical channels" is intended to describe the channel between the wavelength router 46 and the data utilization circuit 18. In other words, the wavelength router 46 may route an optical signals to an electrical channel 30.

More specifically, the wavelength router 46 may route an optical signal to a specific electrical channel 30 based on a predetermined configuration. In other words, the wavelength router 46 may route the optical signal to an electrical channel 30 that the data utilization circuit 18 is expects to receive the data on. For example, the data utilization circuit 18 may expect to receive all status data at the first digital receiver 70A and to receive all measured data at the second digital receiver 70B. Accordingly, the wavelength router 46 may route an optical signal containing status data to the first electrical channel 30A and an optical signal containing measured data to the second electrical channel 30B.

Additionally or alternatively, the wavelength router 46 may consider other factors, such as availability of the electrical channel (e.g., whether carrying other electrical signals) and/or functionality of the electrical channel 16 or digital receiver 70. For example, the optical signals with a 1310 nanometer wavelength may be routed to an electrical channel 16 that includes a photodiode 72 suitable for converting 1310 nanometer optical signals. Thus, the control logic 50 may determine the type of data on each optical signal, determine the actual data on each optical signal, the availability/functionality of each electrical channel 30, the configuration of the data utilization circuit 18, or any combination thereof. In other words, the wavelength router 46 may improve the flexibility of the FPOA 20 by enabling data to be routed to different electrical channels 30, and more specifically different digital receivers 70, without reconfiguring the data utilization circuit 18.

As described above, the photodiodes 72 may convert optical signals into electrical signals. Accordingly, as depicted, the photodiodes 72 may be coupled to the electrical channels 30. More specifically, the photodiodes 72 may convert the optical signal (e.g., light) into an electrical signal by varying the current or voltage output by the photodiode 72. For example, a digital "0" (e.g., light transmission below the lower light transmission threshold) may be indicated by outputting a voltage below or equal to a lower voltage threshold, such as −100 mV, and a digital "1" (e.g., light transmission above the upper light transmission threshold) may be indicated by outputting a voltage above a higher voltage threshold, such as 100 mV. In some embodiments, the data extracted from a multiplexed optical signal may be received by the data utilization circuit 18 substantially simultaneously and in parallel.

Based on the FPOA 20 described above, FIG. 7 describes a process 74 for receiving optical signals. As depicted, the process 74 includes receiving an optical signal (process block 76), de-multiplexing the optical signal (process block 78), routing the optical signal to an electrical channel (process block 80), converting the optical signal to an electrical signal (process block 82), and transmitting the electrical signal (process block 84).

More specifically, the FPOA 20 may receive the optical signal from another data utilization circuit 18 via an optical channel 16 (process block 76). As described above, the optical signals may include data to be processed/stored by the core logic 52. If the optical signal includes multiple optical signals (e.g., with different wavelengths), the control logic 50 may then instruct the wavelength division multiplexer 48 to de-multiplex the optical signal (process block 78). If not, the control logic 50 may instruct the wavelength division multiplexer 48 to leave the optical signal alone.

The control logic 50 may then instruct the wavelength router 46 to route the optical signal to a specific electrical channel (process block 80). As described above, the wavelength router 46 may route the optical signals to an electrical channel 16 based on the intended recipient (e.g., digital receiver 70) of the data or any number of other factors. For example, in some embodiments, the electrical channel 30 routed to may be based upon the type of data transmitted, the contents of the data transmitted, the configuration of the digital receiver, the availability of an electrical channel 30, the functionality of the electrical channel/digital receiver 70, or any combination thereof. The control logic 50 may then instruct the photodiodes 72 to convert optical signal to an electrical signal (process block 82) and instruct the FPOA 20 to transmit the electrical signals to the data utilization circuit 18 via the electrical channels 30 (process block 84).

With the preceding in mind, it should be appreciated that the techniques described herein may provide improved flexibility of optical signal transmission between data utilization circuits. For example, as described above, the FPOA 20 may enable data to be routed between multiple optical channels, enable the bandwidth of each optical channel 16 to be dynamically adjusted, enable the FPOA 20 to self-calibrate, or any combination thereof without reconfiguring the data utilization circuit 18. As will be described in more detail below, the techniques described herein may additionally provide improved functionality in various use cases.

One such use case is switchover, which may improve the reliability of optical signal transmission. As used herein, "switchover" is intended to describe switching transmission of data from a faulty optical channel to a non-faulty (e.g., spare) optical channel. To help illustrate, FIGS. 8A and 8B depict the first integrated circuit device 12 communicatively coupled to the second integrated circuit device 14, which both generally include a data utilization circuit 18 and the FPOA 20 described above, via five optical channels 16. More specifically, FIG. 8A describes the electronic system 10 before switchover (e.g., before a faulty optical channel is detected) and FIG. 8B describes the electronic system 10 after switchover (e.g., after a faulty optical channel is detected).

Before switchover, the first integrated circuit device 12 and the second integrated circuit may communicate data (e.g., optical signals) via four of the optical channels, utilizing the fifth optical channel as a spare, as depicted in FIG. 8A. As described herein, the four optical channels are referred to as "primary" optical channels 16D and the fifth optical channel is referred to as a "spare" optical channel 16E. When a fault on one of the primary optical channels 16D (e.g., faulty optical channel 16F) is detected, the data intended to be transmitted on the faulty optical channel 16F may be switched over to the spare optical channel 16E, as depicted in FIG. 8B. In some embodiments, the control logic 50 in the FPOAs 20 may determine when an optical channel 16 is faulty. For example, the control logic 50 may determine that an optical channel 16 is faulty during handshaking between the integrated circuit devices 12 and 14 when a response to a transmitted signal is not received within a set amount of time (e.g., timeout).

Although it may not be uncommon to utilize a spare optical channel 16E, the present techniques enable the switchover to take place without reconfiguring either data utilization circuits 18. To help illustrate, data is intended to be transmitted from a specific digital driver 54, in a first data utilization circuit 18, to a specific digital receiver 70, in a second data utilization circuit 18, via a primary optical channel 16E. Thus, when the optical channel is determined to be a faulty optical channel 16, the wavelength routers 46 on both sides of the data transmission may make the appropriate routing adjustments to enable the first data utilization circuit 18 to continue outputting the data from the same digital driver 54, and the second data utilization 18 circuit to continue receiving the data at the same digital receiver 70.

In other embodiments, the techniques may enable switchover even without the use of a spare optical channel 16E. For example, the data intended for the faulty optical channel 16F may be routed to another primary optical channel 16D and the data may be multiplexed together and transmitted via the non-faulty primary optical channel 16D. In other words, the FPOA 20 may improve the flexibility (e.g., reliability) of optical signal transmission by enabling the FPOA 20 in each integrated circuit device 12 and 14 to both detect the fault and remedy the fault without reconfiguring the data utilization circuits 18.

Figure 9:
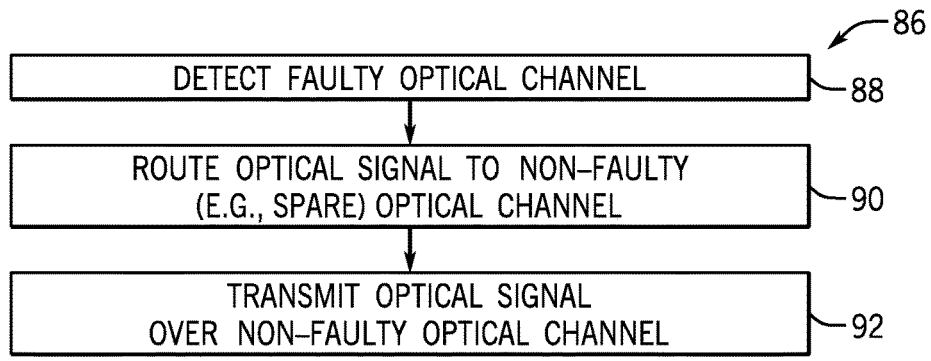
FIG. 9 is a flow chart describing a process for switchover from a faulty optical channel to a spare optical channel, in accordance with an embodiment.

Based on the above description, FIG. 9 describes a process 86 for performing switch over utilizing the techniques described herein. As depicted, the process 86 includes detecting a faulty optical channel (process block 88), routing an optical signal to a non-faulty (e.g., spare) optical channel (process block 90), and transmitting the optical signal via the spare optical channel (process block 92).

More specifically, as described above, the control logic 50 in each FPOA 20 may detect a faulty optical channel 16F (process block 88). For example, the control logic 50 may detect the faulty optical channel 16F when a signal (e.g., response) is not received within an allotted time (e.g., timeout). Additionally, in some embodiments, when one of the FPOAs 20 detects a fault, it may utilize one of the non-faulty optical channels to communicate the status of the faulty optical channel 16F to the other FPOA 20. Furthermore, the FPOAs 20 may collectively agree on a contingency plan, such as whether to switchover to a spare optical channel 16E or to switchover to one of the other primary optical channels 16D. Based on the agreed routing, the wavelength routers 46 may route the optical signal to the spare channel 16E or another non-faulty optical channel (process block 90). The FPOAs 20 may then communicate data on the spare optical channel 16E or another non-faulty optical channel (process block 92).

Figure 10:
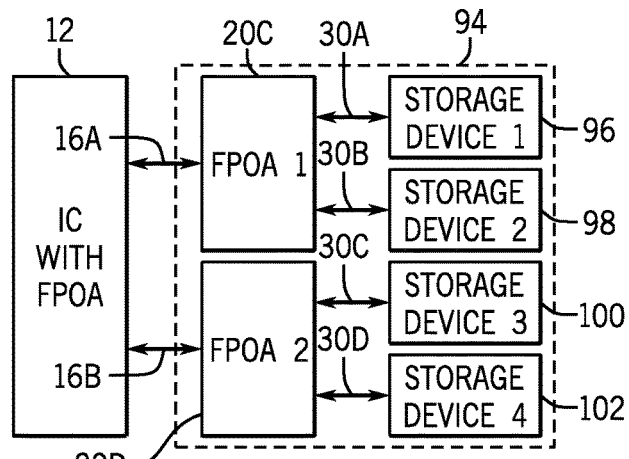
FIG. 10 is a block diagram of an integrated circuit device coupled to redundant memory, in accordance with an embodiment.

Another use case is redundant memory (e.g., redundant data storage devices), which may also improve the reliability of data storage/retrieval. As used herein, "redundant memory" is intended to describe utilizing multiple storage devices to store substantially the same data. To help illustrate, FIG. 10 depicts the first integrated circuit device 12 coupled to redundant memory 94. As depicted, first integrated circuit device 12 is communicatively coupled to a first data storage device 96 and a second storage device 98 (e.g., data utilization circuits 18) via a first FPOA 20C, and is communicatively coupled to a third data storage device 100 and a fourth data storage device (e.g., data utilization circuits 18) via a second FPOA 20D. More specifically, the first integrated circuit device 12 is coupled to the first FPOA 20C via a first optical channel 16A, the first FPOA 20C is coupled to the first data storage device 96 via a first electrical channel 30A, and the first FPOA 20 is coupled to the second data storage device 98 via a second electrical channel 30B. Additionally, the first integrated circuit device 12 is coupled to the second FPOA 20D via a second optical channel 16B, the second FPOA 20D is coupled to the third data storage device via a third electrical channel 30C, and the second FPOA 20D is coupled to the fourth data storage device via a fourth electrical channel 30D. It should be noted that although the present embodiment is described as utilizing single optical and electrical channels, other embodiments may include multiple optical and/or multiple electrical channels.

As described above, the redundant memory 94 may store substantially the same data in multiple storage devices (e.g., storage devices 96-102). Illustratively, in one embodiment, the first storage device 96 and the third storage device 100 may store substantially the same data, and the second storage device 98 and the fourth storage device 102 may store substantially the same data. Accordingly, when the integrated circuit device 12 requests a specific piece of data, both of the storage devices (e.g., first and third storage devices 96 and 100, or second and fourth storage devices 98 and 102) that have stored the data may transmit the data to the first integrated circuit device 12. For example, if the requested data is stored in the first and third storage devices 96 and 100, the first FPOA 20C may route the data from the first electrical channel 30A to the first optical channel 16A and the second FPOA 20D may route the data from the third electrical channel 30C to the second optical channel 16B. Similarly, if the requested data is stored in the second and fourth storage devices 98 and 102, the first FPOA 20C may route the data from the second electrical channel 30B to the first optical channel 16A and the second FPOA 20D may route the data from the fourth electrical channel 30D to the second optical channel 16B.

On the other side, when the first integrated circuit device 12 stores a specific piece of data in a storage device, the data may also be stored in a related (e.g., redundant pair) storage device. For example, if the data is to be stored in the first storage device 96, the first FPOA 20C may route the data from the first optical channel 16A to the first electrical channel 30A and the second FPOA 20C may route the data from the second optical channel 16B to the third electrical channel 30C. Similarly, if the data is to be stored in the second storage device 98, the first FPOA 20C may route the data from the first optical channel 16B to the third electrical channel 30C and the second FPOA 20D may route the data from the second optical channel 16B to the fourth electrical channel 30D.

Thus, the FPOAs 20 may allocate the bandwidth of the optical channels by rerouting the connections between the optical channels and the various electrical channels based on which storage device has specific data stored and/or which storage device specific data is intended to be stored in. For example, the first and second FPOAs 20C and 20D, and more specifically their respective control logic 50, may determine which storage device 96-102 has stored requested data and/or is intended to store data. In other words, the FPOAs 20 may improve the reliability of data storage/retrieval by enabling the FPOAs 20 to reroute the connections (e.g., allocate bandwidth) with the redundant storage devices without reconfiguring the integrated circuit device or the storage devices 96-102.

In other embodiments, the FPOAs 20C and 20D may split (e.g., allocate) the bandwidth of the optical channels between the storage devices 96-102 (e.g., when the first integrated circuit device 12 is coupled to the first and second FPOAs via multiple optical channels). For example, the first FPOA 20C may allocate a larger number of optical signals to the first storage device 96 as compared to the second storage device 98 to prioritize transmission to/from the first storage device 96.

Figure 11:
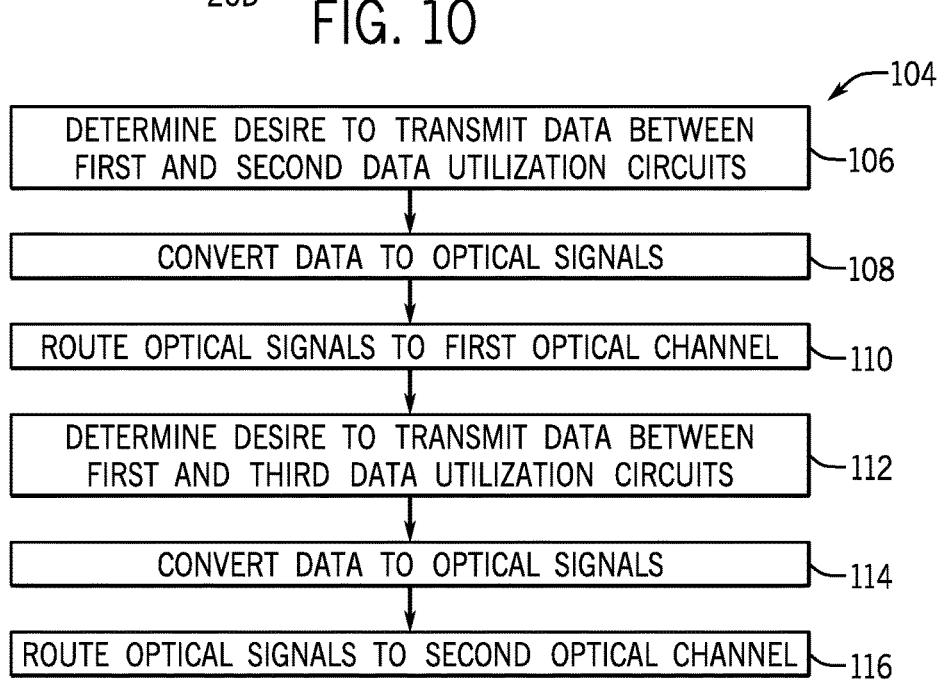
FIG. 11 is a flow chart describing a process for adjusting bandwidth of various optical channels, in accordance with an embodiment.

Based on the above description, FIG. 11 describes a general process 104 for dynamically adjusting bandwidth that may be utilized in the redundant memory use case as well as other use cases describe herein. As depicted, the process 104 includes determining a desire to transmit data between a first data utilization circuit and a second data utilization circuit (process block 106), converting the data to an optical signal (process block 108), routing the optical signal to a first optical channel (process block 110), determining a desire to transmit data between the first data utilization circuit and a third data utilization circuit (process block 112), converting the data to an optical signal (process block 114), and routing the optical signal to a second optical channel (process block 116).

Figure 12:
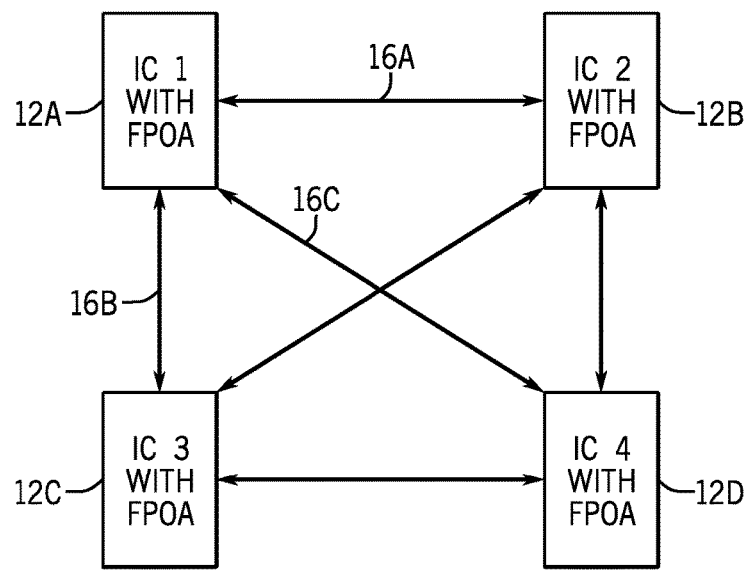
FIG. 12 is a block diagram of a plurality of integrated circuit devices communicatively coupled via field programmable optical arrays, in accordance with an embodiment.

Illustratively, FIG. 12 describes a network of integrated circuit devices use case that may utilize the bandwidth allocation process 104. As depicted, a first integrated circuit device 12A, a second integrated circuit device 12B, a third integrated circuit device 12C, and a fourth integrated circuit device 12D are each communicatively coupled to one another. Accordingly, by utilizing the techniques described herein, each of the integrated circuit devices 12A-12D may dynamically adjust the data communication bandwidth with each of the other integrated circuit device 12A-12D.

As depicted, the first integrated circuit device 12A is communicatively coupled to the second integrated circuit device 12B via a first plurality of optical channels 16A, to the third integrated circuit device 12C via a second plurality of optical channels 16B, and to the fourth integrated circuit device 12D via a third plurality of optical channels 16C. Accordingly, the first integrated circuit device 12A may prioritize the data transmission bandwidth through the routing of the optical signals. For example, if the first integrated circuit device 12A wanted to prioritize transmission of data to the second integrated circuit device 12B, the FPOA 20 in the first integrated circuit device may route all or a majority of the optical signals to the first plurality of optical channels 16A. Additionally, in some embodiments, the remaining optical signals may be routed to the second plurality of optical channels 16B and the third plurality of optical channels 16C in any configuration, which may take into account a prioritization between the third integrated circuit device 12C and the fourth integrated circuit device 12D.

Figure 13:
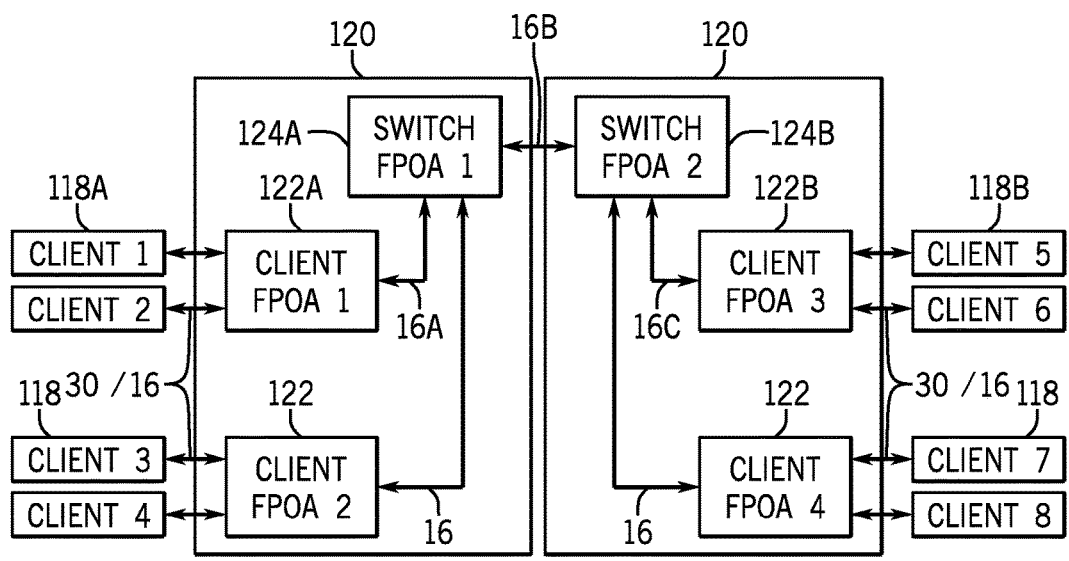
FIG. 13 is a block diagram of a datacenter utilizing field programmable optical arrays, in accordance with an embodiment.

Furthermore, FIG. 13 depicts a data center use case that may utilize the bandwidth allocation process 104. As depicted, client computing devices (e.g., data utilization circuits) 118 may be communicatively coupled to one another via data centers 120. More specifically, as depicted, the data centers 120 include client FPOAs 122 communicatively coupled to the client computing device 118 via electrical channels 30 or optical channels 16, and a switch FPOA 124 communicatively coupled to the client FPOAs 122 via optical channels 16. Additionally, the switch FPOAs 124 are communicatively coupled via optical channels 16. Accordingly, by utilizing the techniques described herein, the client FPOAs 122 and the switch FPOAs 124 may dynamically adjust their respective data transmission bandwidths, for example, to prioritize communication between particular client computing devices 118.

To help illustrate, the data transmission bandwidth may be prioritized for the transmission of data from a first client computing device 118A to a second client computing device 118B. More specifically, a first client FPOA 122A may route data transmitted from the first client computing device 118 to all or a majority of a first plurality of optical channels 16A coupled to a first switch FPOA 124A, the first switch FPOA 124A may route the data to all or a majority of a second plurality of optical channels 16B coupled to a second switch FPOA 124B, and the second switch FPOA 124B may route the data to all or a majority of a third plurality of optical channels coupled to a second client FPOA 122B, which may then transmit the data to the second client computing device 118B. In other embodiments, the exact bandwidth allocation (e.g., optical signal routing) may be balanced between each of the client computing devices 118.

Technical effects of the present disclosure include improving flexibility of optical signal communication between integrated circuit devices, and more specifically data utilization circuits. More specifically, a FPOA 20 may improve flexibility by enabling the output/input configuration (e.g., bandwidth) to be dynamically adjusted. For example, the FPOA 20 may route no optical signals to an optical channel, one optical signal to the optical channel, or multiple optical signals to the optical channel without reconfiguring the data utilization circuit 18. Additionally, the ability to adjust the output/input configuration may provide added features in various use cases. For example, the FPOA 20 may detect a faulty optical channel and route data to a non-faulty channel to improve reliability.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. Moreover, means-plus-function or step-plus-function construction is not intended unless a claim recites "means for" or "step for" followed by a function. Recitations such as "configured to" are intended to define the operation of claim elements without invoking means-plus-function or step-plus-function construction.

What is claimed is:

1. An integrated circuit device comprising:
   a first data utilization circuit that inputs and outputs electrical signals via a plurality of electrical channels; and
   a first field programmable optical array directly integrated with the first data utilization circuit, wherein the first field programmable optical array comprises:
      a wavelength router coupled between the plurality of electrical channels and a plurality of optical channels, wherein the wavelength router routes optical signals from at least one of the plurality of electrical channels to one of the plurality of optical channels, routes optical signals from one of the plurality of optical channels to at least one of the plurality of electrical channels, or both; and
      a wavelength-division multiplexer coupled to the plurality of optical channels, wherein the wavelength-division multiplexer multiplexes optical signals received from the wavelength router, de-multiplexes a multiplexed optical signal received from a different field programmable optical array, or both.

2. The integrated circuit device of claim 1, wherein the first field programmable optical array comprises:
   a plurality of modulators that convert an electrical signal into an optical signal, wherein each one of the plurality of modulators is coupled to one of the plurality of electrical channels;
   a plurality of photodiodes that convert an optical signal into an electrical signal, wherein each one of the plurality of photodiodes is coupled to one of the plurality of electrical channels; or
   both.

3. The integrated circuit device of claim 1, wherein the first data utilization circuit comprises:
   core logic that processes data, stores data, or both;
   a digital driver communicatively coupled to the plurality of electrical channels, wherein the digital driver outputs data as an electrical signal on one or more of the plurality of electrical channels; and
   a digital receiver communicatively coupled to the plurality of electrical channels, wherein the digital receiver receives data as an electrical signal from one or more of the plurality of electrical channels.

4. The integrated circuit device of claim 1, wherein:
   the first data utilization circuit comprises a data processing circuit, a data storage circuit, or both;
   the first data utilization circuit and the first field programmable optical array are formed on a same semiconductor chip; or
   both.

5. The integrated circuit device of claim 1, wherein:
   the first field programmable optical array is communicatively coupled to the first data utilization circuit and converts an electrical signal received from the first data utilization circuit to a first optical signal, wherein the first optical signal comprises a first wavelength;
   the wavelength router routes the first optical signal to an optical channel; and
   the wavelength-division multiplexer multiplexes the first optical signal with a second optical signal routed to the optical channel, wherein the second optical signal comprises a second wavelength.

6. The integrated circuit device of claim 5, wherein the first field programmable optical array transmits a multiplexed optical signal comprising the first optical signal and the second optical signal to a second field programmable optical array communicatively coupled to a second data utilization circuit via a first optical channel to enable the second data utilization circuit to process, store, or both data corresponding with the first optical signal, the second optical signal, or both.

7. The integrated circuit device of claim 6, wherein the first field programmable optical array:
   routes a third optical signal to a second optical channel;
   routes no optical signals to a third optical channel; and
   transmits the multiplexed optical signal via the first optical channel and the third optical signal via the second optical channel substantially simultaneously.

8. The integrated circuit device of claim 5, wherein the first field programmable optical array:
   routes the first optical signal to the first optical channel and multiplexes the first optical signal with the second optical signal without reconfiguring the first data utilization circuit;
   routes the first optical signal to the optical channel based at least in part on an intended recipient of the first optical signal to enable the intended recipient to process, store, or both data transmitted via the first optical signal, wherein the intended recipient is communicatively coupled to the first optical channel; or
   both.

9. The integrated circuit device of claim 5, wherein the first field programmable optical array:
   de-multiplexes a multiplexed optical signal comprising a third optical signal and a fourth optical signal, wherein the third optical signal comprises a third wavelength and the fourth optical signal comprises a fourth wavelength;
   routes the third optical signal to an electrical channel;
   converts the third optical signal to a second electrical signal; and
   outputs the second electrical signal to the first data utilization circuit via the electrical channel to enable the first data utilization circuit to process, store, or both data indicated by the third optical signal.

10. The integrated circuit device of claim 5, wherein:
   the first data utilization circuit inputs and outputs electrical signals via a plurality of electrical channels; and
   the first field programmable optical array is integrated with the first data utilization circuit and comprises:
      a wavelength router coupled between the plurality of electrical channels and a plurality of optical channels, wherein the wavelength router routes optical signals from at least one of the plurality of electrical channels to one of the plurality of optical channels, routes optical signals from one of the plurality of optical channels to at least one of the plurality of electrical channels, or both; and
      a wavelength-division multiplexer coupled to the plurality of optical channels, wherein the wavelength-division multiplexer multiplexes optical signals received from the wavelength router, de-multiplexes a multiplexed optical signal received from a different field programmable optical array, or both.

11. The integrated circuit device of claim 5, wherein the first field programmable optical array:
   receives an indication to transmit data from the first data utilization circuit to a second data utilization circuit, wherein the first data utilization circuit and the second data utilization circuit are communicatively coupled by the first field programmable optical array coupled to the first data utilization circuit, a second field programmable optical array coupled to the second data utilization circuit, and the optical channel, wherein the optical channel is coupled between the first field programmable optical array and second field programmable optical array;

converts the electrical signal to the first optical signal by converting the data received from the first data utilization circuit into the first optical signal with a modulator in the first field programmable optical array;

routes the first optical signal to the optical channel with a wavelength router in the first field programmable optical array without reconfiguring the first data utilization circuit; and transmits the first optical signal to the second field programmable optical array via the optical channel to enable the second data utilization circuit to process, store, or both the data.

12. The integrated circuit device of claim 1, wherein:
the wavelength-division multiplexer de-multiplexes a multiplexed optical signal comprising a first optical signal and a second optical signal, wherein the first optical signal comprises a first wavelength and the second optical signal comprises a second wavelength;
the wavelength router routes the first optical signal to an electrical channel; and
the first field programmable optical array:
  is communicatively coupled to the first data utilization circuit;
  converts the first optical signal to an electrical signal; and
  outputs the electrical signal to the first data utilization circuit via the electrical channel to enable the first data utilization circuit to process, store, or both data indicated by the first optical signal.

13. The integrated circuit device of claim 12, wherein the first field programmable optical array:
  routes the second optical signal to another electrical channel;
  converts the second optical signal to another electrical signal; and
  outputs the other electrical signal to the first data utilization circuit via the other electrical channel, wherein the electrical channel and the other electrical channel are connected in parallel, wherein the first field programmable optical array outputs the electrical signal and the other electrical signal to the first data utilization circuit substantially simultaneously and in parallel.

14. The integrated circuit device of claim 12, wherein the first field programmable optical array:
  de-multiplexes the multiplexed optical signal and routes the first optical signal to the electrical channel without reconfiguring the first data utilization circuit;
  routes the first optical signal to the electrical channel based at least in part on type of data transmitted on the first optical signal, contents of the data transmitted on the first optical signal, configuration of a digital receiver coupled to the first electrical channel, availability of the electrical channel, functionality of the electrical channel, functionality of the digital receiver, or any combination thereof; or
  both.

15. The integrated circuit device of claim 12, wherein the first field programmable optical array:

converts a second electrical signal received from the first data utilization circuit to a third optical signal, wherein the third optical signal comprises a third wavelength;
routes the third optical signal to an optical channel; and
multiplexes the third optical signal with a fourth optical signal routed to the optical channel, wherein the fourth optical signal comprises a fourth wavelength.

16. The integrated circuit device of claim 12, wherein:
the first data utilization circuit inputs and outputs electrical signals via a plurality of electrical channels; and
the first field programmable optical array is integrated with the first data utilization circuit and comprises:
  a wavelength router coupled between the plurality of electrical channels and a plurality of optical channels, wherein the wavelength router routes optical signals from at least one of the plurality of electrical channels to one of the plurality of optical channels, routes optical signals from one of the plurality of optical channels to at least one of the plurality of electrical channels, or both; and
  a wavelength-division multiplexer coupled to the plurality of optical channels, wherein the wavelength-division multiplexer multiplexes optical signals received from the wavelength router, de-multiplexes a multiplexed optical signal received from a different field programmable optical array, or both.

17. The integrated circuit device of claim 12, wherein the first field programmable optical array:
  receives an indication to transmit data from the first data utilization circuit to a second data utilization circuit, wherein the first data utilization circuit and the second data utilization circuit are communicatively coupled by the first field programmable optical array coupled to the first data utilization circuit, a second field programmable optical array coupled to the second data utilization circuit, and an optical channel coupled between the first field programmable optical array and second field programmable optical array;
  converts the data received from the first data utilization circuit into a third optical signal with a modulator in the first field programmable optical array;
  routes the third optical signal to the optical channel with a wavelength router in the first field programmable optical array without reconfiguring the first data utilization circuit; and
  transmits the third optical signal to the second field programmable optical array via the optical channel to enable the second data utilization circuit to process, store, or both the data.

18. The integrated circuit device of claim 1, wherein the first field programmable optical array:
  receives an indication to transmit data from the first data utilization circuit to a second data utilization circuit, wherein the first data utilization circuit and the second data utilization circuit are communicatively coupled by the first field programmable optical array coupled to the first data utilization circuit, a second field programmable optical array coupled to the second data utilization circuit, and an optical channel coupled between the first field programmable optical array and second field programmable optical array;
  converts the data received from the first data utilization circuit into an optical signal with a modulator in the first field programmable optical array;
  routes the optical signal to the optical channel with the wavelength router without reconfiguring the first data utilization circuit; and transmits the optical signal to the second field programmable optical array via the optical channel to enable the second data utilization circuit to process, store, or both the data.

19. The integrated circuit device of claim 18, wherein the first field programmable optical array:
receives an indication to transmit the data from the first data utilization circuit to a third data utilization circuit, wherein the first data utilization circuit and the third data utilization circuit are communicatively coupled by the first field programmable optical array, a third field programmable optical array coupled to the third data utilization circuit, and another optical channel coupled between the first field programmable optical array and the third field programmable optical array;
re-routes the optical signal to the other optical channel with the wavelength router in the first field programmable optical array without reconfiguring the first data utilization circuit; and
transmits the optical signal to the third field programmable optical array via the other optical channel to enable the third data utilization circuit to process, store, or both the data.

20. The integrated circuit device of claim 18, wherein the first field programmable optical array:
receives an indication to transmit other data from the first data utilization circuit to the second data utilization circuit substantially simultaneously with the data;
converting the other data received from the first data utilization circuit into another optical signal with another modulator in the first field programmable optical array;
routing the other optical signal to the optical channel with the wavelength router in the first field programmable optical array without reconfiguring the first data utilization circuit;
multiplexing the optical signal with the other optical signal to generate a multiplexed optical signal, wherein the optical signal comprises a first wavelength and the other optical signal comprises a second wavelength; and
transmitting the multiplexed optical signal to the second field programmable optical array via the optical channel to enable the second data utilization circuit to process, store, or both the data and the other data.

21. The integrated circuit device of claim 18, wherein the first field programmable optical array:
receives an indication to transmit other data from the first data utilization circuit to a third data utilization circuit substantially simultaneously with the data to the second data utilization circuit, wherein the first data utilization circuit and the third data utilization circuit are communicatively coupled by the first field programmable optical array, a third field programmable optical array coupled to the third data utilization circuit, and a second optical channel coupled between the first field programmable optical array and the third field programmable optical array;
converts the other data received from the first data utilization circuit to another optical signal with another modulator in the first field programmable optical array;
routes the other optical signal to the second optical channel with the wavelength router in the first field programmable optical array without reconfiguring the first data utilization circuit; and
transmits the optical signal to the first field programmable optical array via the optical channel and the other optical signal to the second field programmable optical array via the other optical channel substantially simultaneously.

22. The integrated circuit device of claim 18, wherein the first field programmable optical array:
receives an indication to transmit other data from the first data utilization circuit to a third data utilization circuit substantially simultaneously with the data to the second data utilization circuit, wherein the first data utilization circuit and the third data utilization circuit are communicatively coupled by the first field programmable optical array, a third field programmable optical array coupled to the third data utilization circuit, and another optical channel coupled between the first field programmable optical array and the third field programmable optical array;
converts the other data received from the first data utilization circuit to a plurality of optical signals with another modulator in the first field programmable optical array, wherein each of the plurality of optical signals comprises a different wavelength;
routes the plurality of optical signals to the other optical channel with the wavelength router in the first field programmable optical array without reconfiguring the first data utilization circuit;
multiplexes the plurality of optical signals into a multiplexed optical signal; and
transmits the optical signal to the first field programmable optical array via the optical channel and the multiplexed optical signal to the second field programmable optical array via the other optical channel substantially simultaneously.

23. The integrated circuit device of claim 18, wherein the first field programmable optical array multiplexes the optical signal with another optical signal routed to the optical channel, wherein the optical signal comprises a first wavelength and the other optical signal comprises a second wavelength;
wherein converting the data into the optical signal comprises converting an electrical signal received from the first data utilization circuit to the optical signal.

24. The integrated circuit device of claim 18, wherein the first field programmable optical array:
de-multiplexes a multiplexed optical signal comprising a second optical signal and a third optical signal, wherein the second optical signal comprises a second wavelength, and the third optical signal comprises a third wavelength;
routes the second optical signal to an electrical channel with the wavelength router;
converts the optical signal to an electrical signal; and
outputs the electrical signal to the first data utilization circuit via the electrical channel to enable the first data utilization to store, process, or both second data indicated by the second optical signal.

25. The integrated circuit device of claim 18, wherein:
the first data utilization circuit inputs and outputs electrical signals via a plurality of electrical channels; and
the first field programmable optical array is integrated with the first data utilization circuit;
the wavelength router is coupled between the plurality of electrical channels and a plurality of optical channels, wherein the wavelength router routes optical signals from at least one of the plurality of electrical channels to one of the plurality of optical channels, routes optical signals from one of the plurality of optical channels to at least one of the plurality of electrical channels, or both; and the first field programmable optical array comprises a wavelength-division multiplexer coupled to the plurality of optical channels, wherein the wavelength-division multiplexer multiplexes optical signals received from the wavelength router, de-multiplexes a multiplexed optical signal received from a different field programmable optical array, or both.

* * * * *